United States Patent

Hayashi et al.

[11] Patent Number: 5,874,696
[45] Date of Patent: Feb. 23, 1999

[54] KEY SWITCH, KEYBOARD AND PORTABLE INFORMATION PROCESSING UNIT WITH KEYBOARD

[75] Inventors: Kazutoshi Hayashi; Junichi Maruyama, both of Suzaka, Japan

[73] Assignee: Fujitsu Takamisawa Component Limited, Tokyo, Japan

[21] Appl. No.: 777,868

[22] Filed: Dec. 31, 1996

[30] Foreign Application Priority Data

Aug. 12, 1996 [JP] Japan ..................................... 8-212496

[51] Int. Cl.⁶ ..................................................... H01H 13/70
[52] U.S. Cl. .......................... 200/5 A; 361/680; 400/490; 200/345
[58] Field of Search ..................................... 200/5 R, 5 A, 200/512, 517, 341, 344, 345; 235/1 D, 145 R, 146; 341/22; 345/168, 167; 361/680; 364/708.1; 400/472, 480, 490, 492, 495, 495.1, 477, 488, 682

[56] References Cited

U.S. PATENT DOCUMENTS

| | | | |
|---|---|---|---|
| 5,268,545 | 12/1993 | Bruner | 200/345 |
| 5,519,569 | 5/1996 | Sellers | 361/680 |
| 5,532,904 | 7/1996 | Sellers | 361/680 |
| 5,562,203 | 10/1996 | Mochizuki | 200/345 |
| 5,621,610 | 4/1997 | Moore et al. | 361/680 |
| 5,635,928 | 6/1997 | Takagi et al. | 341/22 |

FOREIGN PATENT DOCUMENTS 5-298000 11/1993 Japan ................................. G06F 3/02
8-054964 2/1996 Japan ................................. G06F 1/16

Primary Examiner—Michael A. Friedhofer
Attorney, Agent, or Firm—Staas & Halsey

[57] ABSTRACT

A portable information processing unit, such as a personal computer, has a keyboard in which the normal, operating height of key switches is reduced to a more compact, reduced height automatically when a cover of the unit is closed and is automatically reinstated to the normal operating height when the cover is opened. Each key switch has a key top, a base, an actuating mechanism connecting the key top to the base, an elastic member and a switching layer, the elastic member extending through an opening in the base and interconnecting the key top and the switch. Depression of the key top produces movement thereof in a depressing direction and a depression force transferred through the elastic member to the switch, switching same from an off to an on state; upon release of the key top, the elastic member returns the key top to the normal position. A slide plate is positioned between the base and the switch and has an opening therein through which the elastic member extends and is moveable in reciprocating directions between first and second positions corresponding to, and in response to, movement of the cover between closed and open conditions, the slide plate, in the first position corresponding to the closed condition of the cover, causing the actuating mechanism to move the key top in the depressing direction, compressing the elastic member and reducing the height of the key switches.

23 Claims, 12 Drawing Sheets

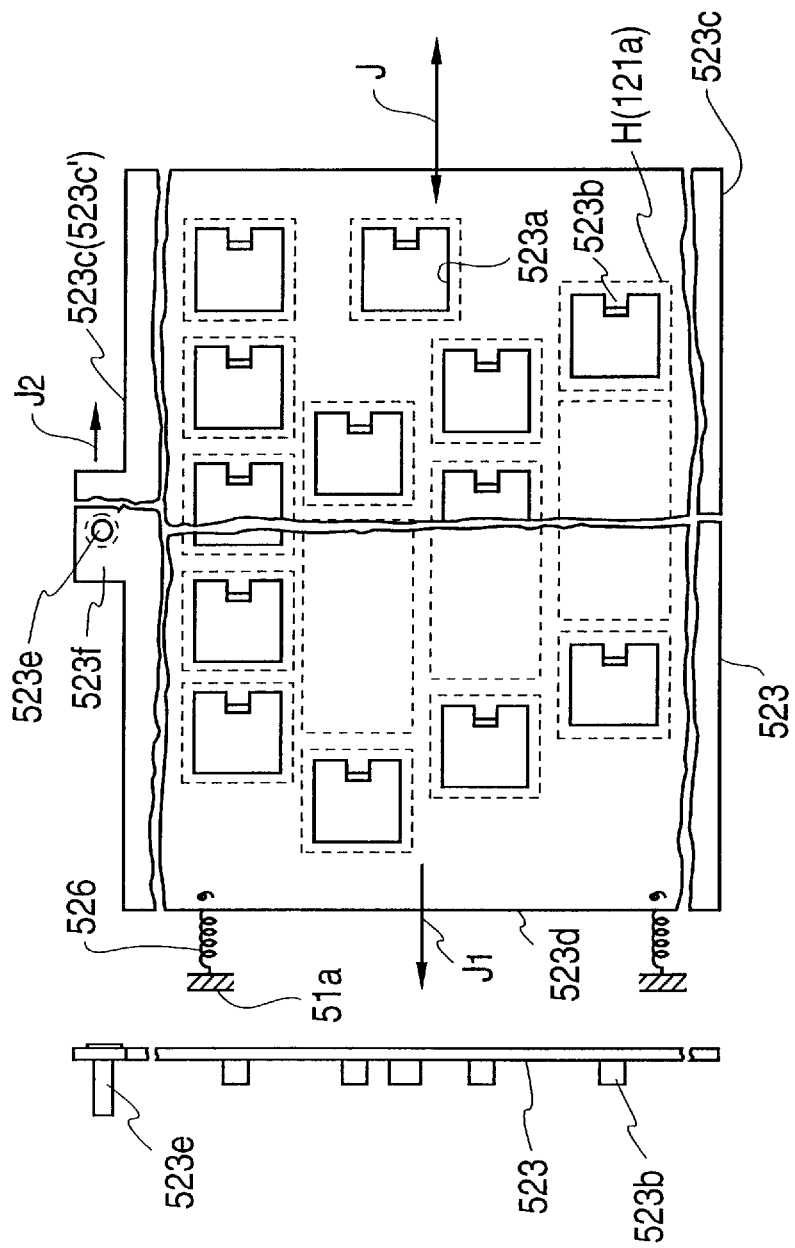

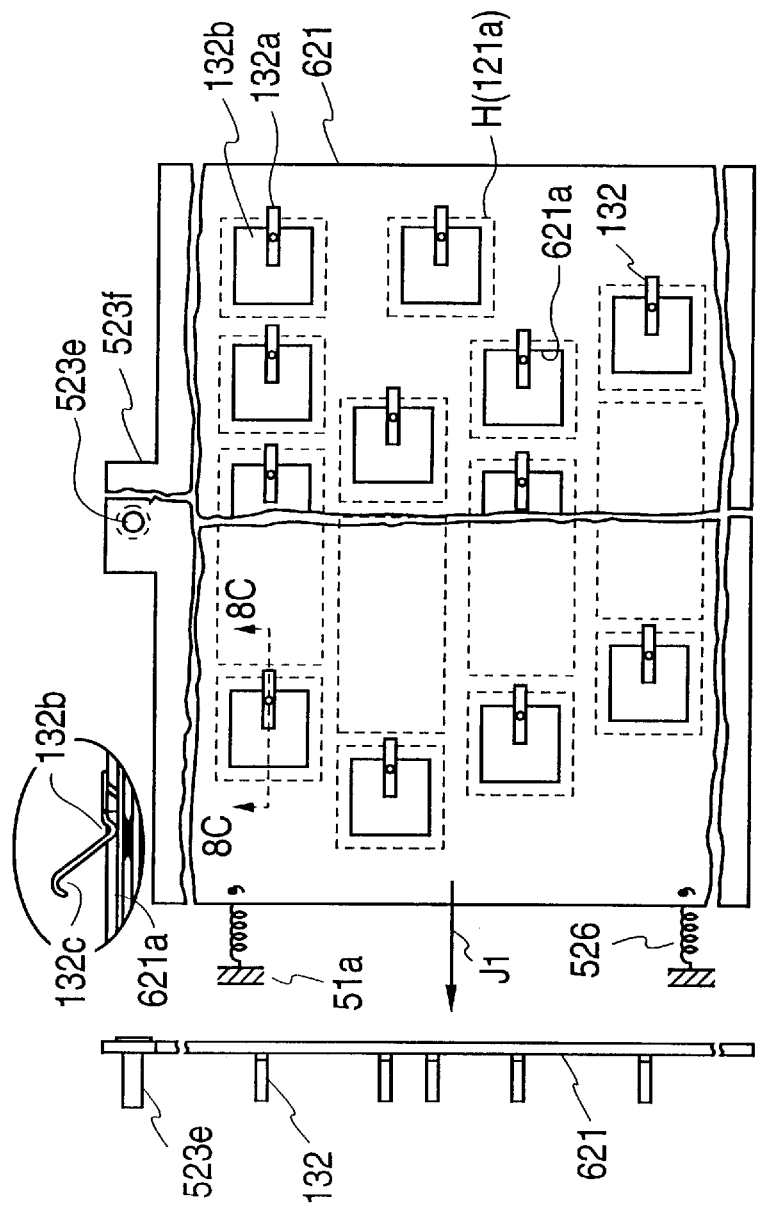

KEY SWITCH, KEYBOARD AND PORTABLE INFORMATION PROCESSING UNIT WITH KEYBOARD

BACKGROUND OF THE INVENTION

1. Field of the Invention

The present invention relates to a key switch, a keyboard comprising a plurality of key switches, and a portable information processing unit with a keyboard, and more particularly to a structure of a portable information processing unit allowing the height of key switches on the keyboard to be lowered in a closed state of a cover thereof.

2. Description of the Related Art

One principal problem of a portable information processing unit, such as a notebook-size personal computer which has come into widespread use, is how to accomplish size reduction thereof, particularly a reduction of a height (thickness) thereof, for the purpose of making it more convenient to carry. Referring to Figures, as one example, a description will be made hereinbelow of a structure of a notebook-size personal computer. FIG. 9 is a perspective view schematically showing the whole structure of a notebook-size personal computer. In this figure, a housing of a personal computer 1 is composed of a main body 11a for accommodating a keyboard 12 and a cover 11b which mounts therein a display 19, such as a liquid crystal panel. The cover 11b is openable and closable about a hinge 11c fitted in one side of the main body 11a, to a desired angle a between 90 degrees and 180 degrees. When selectively holding down a plurality of key switches 129 arranged on the keyboard 12 according to a given rule, the letters and symbols corresponding to the pressed key switches 129 appear on the display 19 or the results of the designated processing appear thereon.

FIG. 10 is a partial perspective view showing a keyboard to be used in such a notebook-size personal computer 1, including an exploded illustration of one key switch and a cross section of a principal component. As illustrated, the keyboard 12 is composed of a membrane switch composite 121, in which switching areas 121a are assigned to given locations, a plurality of key switches 129 disposed in positions corresponding to the switching regions 121a, and a unitary molded base 123 common to the plurality of key switches 129. The membrane switch composite 121 includes two insulating films stacked and spaced from each other by a small gap. Each of the key switches 129 includes one rubber actuator 122, two links 124 and a key top 125. A plurality of electric contacts (the areas 121a are indicative of their positions) are made on the respective inner surfaces of the insulating films in the membrane switch composite 121. The rubber actuator 122 is disposed on the membrane switch composite 121 so as to be in corresponding relation to the switching areas 121a. The membrane switch composite 121 is fixed onto a bottom plate 11a' of the main body 11a.

The rubber actuator 122 with a bowl-like configuration is equipped with a flange 122a formed at the circumferential portion of its open end, and is inserted into a through hole 123b of the molded base 123 from the direction indicated by an arrow A. The rubber actuator 122 develops a reversible deformation when its head portion is pressed with a given pressure, so that its open end surface depresses the membrane switch 121, which accomplishes the connection of the electric contacts formed in the membrane switch 121. On release from this depression, the rubber actuator 122 is restorable from its deformed state, thereby to break the electric contact connection.

The molded base 123 has a planar dimension substantially equal to that of the membrane switch 121, where a plurality of through holes 123b are made with each corresponding to each of the switching areas 121a of the membrane switch 121. On the base 123 there is installed a wall 123a surrounding an area around each of the through holes 123b. The rubber actuator 122, inserted into the through hole 123b from the arrow A direction, is located so that its head portion 122b protrudes upwardly from a bottom surface 123d of the base 123. The rubber actuator 122 is fixedly secured onto the base mold 123 in the manner that its flange portion 122a is fitted in a step around the through hole 123b. On the upper surface of the bottom wall 123d of the base 123, in the vicinities of four corners of each of areas enclosed by the wall 123a, there are disposed two pairs of hooks 123c each comprising a column section $123c_{-1}$ and an arm section $123c_{-2}$ linked to make an L-shaped configuration. The two pairs of hooks 123c are fixed onto the base mold 123 in a state where they sit, back to back with each other and with the tip portions of the arm sections $123c_{-2}$ the respective opposed portions of the wall 123a.

Each of the pair of links 124 is composed of a connection section 124a and a pair of arms 124c extending at right angles from both ends of the connection section 124a. The length of the connection section 124a is slightly shorter than the separation a2 between each pair of hooks 123c fixed on the base 123. Each of the arms 124c has a projection 124b and a projection 124d on its outside surface. The projection 124b has a diameter to allow the insertion thereof into a gap between the arm section $123c_2$ of the hook 123c and the bottom surface 123d of the base mold 123, whereas the projection 124d has a diameter to allow the fitting in a bearing hole made in a hook 125c fixed onto the inner top surface of the key top 125.

Accordingly, the projection 124b on each of arms 124c of the link 124 is put into the space between the arm section $123c_{-2}$ of the corresponding hook 123c and the base 123 as indicated by an arrow B, the link 124 then being rotatable about the axis of the projection 124b. On the other hand, as indicated by an arrow D, the projection 124d on each of the arms 124c is fitted in the bearing hole of the corresponding hook 125c (indicated with a dotted line) formed inside the key top 125. Whereupon, the link 124 is rotatable about the axis of the projection 124d.

With this structure, the plural key tops 125 are coupled through the respective links 124 to the base 123. Each of the key tops 125 has a plane size substantially equal to that of each area surrounded by the wall 123a of the base 123, and in general its outer surface 125a has a configuration to make a portion of a square conical surface. A projection 125b which is rod-like or cylindrical, for example, is formed in the vicinity of the center inside of the key top 125.

A keyboard comprising the above-mentioned components is assembled as follows. First, the membrane switch 121 is mounted on the bottom surface 11a' of the main body 11a. Secondly, for example, the rubber actuator 122 is mounted on each of the switching areas 121a of the composite membrane switch 121, and subsequently the base 123 is fixed onto the main body 11a. The rubber actuator 122 mounted at a given portion of the composite membrane switch 121 is positioned by the base 123. Then, the base 123 and each of the key tops 125 are connected through the two links 124. Thus, the keyboard 12 as shown in FIG. 9 is completed with the plurality of key switches 129 provided.

FIGS. 11A and 11B show cross sections of the keyboard 12. FIG. 11A shows a non-operated state of the keyboard 12

(no depression of the key top), while FIG. 11B illustrates an operated state thereof (depression of the key top). In FIG. 11A, the tip surface of the projection 125b of the key top 125 is brought into contact with the head portion 122b of the rubber actuator 122. In this state, the switching area 121a of the membrane switch composite 121 is in a non-contact state as illustrated. When the key top 125 is depressed as shown in FIG. 11B, the projections 124b in the connection section sides of the two link 124 slide in directions of separating from each other (the direction of approaching the corresponding wall 123a) between the bottom surface 123d of the base 123 and the arm $123c_{-2}$ of the hook 123c. Thus, the depression of the projection 125b of the key top 125 against the head portion 122b of the rubber actuator 122 continues to create the deformation of the rubber actuator 122. At the time that the depression of the key top 125 reaches a given position, the rubber actuator 112 develops the maximum deformation so that the switching area 121a comes into the connecting condition. Commonly, the hollow rubber actuator 122 is rapidly bent in a ringlike form at the portion in the vicinity of the flange 122a (called reversible inversion), and the key top 125 reaches the maximum depression position. A click sensation is given in the process of this depression.

On releasing the key top 125 from the depressing operation, the rubber actuator 122 restores, or recovers, to its original shape as shown in FIG. 11A due to its own elastic force. In consequence, the projections 124b in the connection section sides of the links 124 slide in directions of approaching each other (the directions of separating from the corresponding walls 123a) between the bottom surface 123d of the base 123 and the arm $123c_{-2}$ of the hook 123c, so that the key top returns to its initial position. Thus, with the depression of the key top 125 or with the releasing from the depression, an electrical on and off operation takes place in the switching area 121a.

FIGS. 12A and 12B are cross-sectional views showing another keyboard to be used for the notebook-size personal computer as shown in FIG. 9, where the keyboard is cut in one key switch area and extracted. FIG. 12A shows a non-operated state of the key board, while FIG. 12B illustrates an operated condition thereof. In FIG. 12A, a keyboard 13 is made up of a composite membrane switch 121 fixed onto a bottom plate 11a' of a main body 11a and a plurality of key switches 139 fixedly disposed at given portions of the membrane switch composite 121, even a single key switch is shown. Each of the key switches 139 comprises a tongue-like actuator 132 corresponding to one of a plurality of contacts formed on the composite membrane switch 121, a base 133 to which one end portion of the actuator 132 is fixed, and a key top 134 mounted on the base 133 so as to be movable by a given stroke in a depressing direction. Each of the composite membrane switch 121 and the base 133 is one member common to the plurality of key switches 139, and the plurality of key switches 139 are disposed at the corresponding positions defined therein.

Each of the actuators 132 is constructed with a spring metallic plate and is provided with a contact pressing section 132b for pressing the corresponding contact of the composite membrane switch 121. In addition, the actuator 132 having one end portion fixed to the base 133 extends from the contact pressing section 132b toward the other free end portion 132c to gradually separate from the composite membrane switch 121. The base 133 has areas each corresponding to each of the key switches 139 and provided with a square through hole 133a in each of the areas. A plurality of projections 133b are formed on the upper portion (the portion most remote from the composite membrane switch) of the circumferential side wall surface of the through hole 133a. The key top 134 has a configuration similar to that shown in FIG. 9 and its outer surface 134a makes a square conical surface. Further, a projection 134b which is circular, for example, is provided in an inner central portion of the key top 134. In general, at the circumference of the projection 134b there is placed a sleeve section 134c which can be engaged into the through hole 133a of base 133 to be slidable. A plurality of projections 134d are formed on the outer surface of the sleeve section 134c. In a state where the sleeve section 134c is inserted into the through hole of the base 133, the key top 134 is movable by a given stroke in the insertion direction. The upper limit of the movement thereof is the position where the projection 133b in the base 133 side comes into contact with the projection 134d in the key top 134 side.

The assembly of the key top 134 is as follows. That is, first, the actuator 132 is amounted on a given location of the base 133. Secondly, the composite membrane switch 121 is mounted on the bottom plate 11a' of the housing main body 11a. Subsequently, for example, the base 133 is fixed onto the housing main body 11a so that the contact pressing section 132b of the tongue-like actuator 132 is located at each of the switching areas 121a of the composite membrane switch 121. Finally, the plurality of key tops 134 are set at given positions of the base 133, thus completing the keyboard 13, as now equipped with the key switches 139 whose number equals the number of contacts of the membrane switch composite 121.

FIG. 12A shows a case in which the key top 134 is at the upper limit position. The free end portion 132c of the actuator 132 is in the state with being placed into contact with the lower end surface of the projection 134b of the key top 134. FIG. 12B illustrates a state where the key top 134 is depressed up to the lower limit. The projection 134b presses the free end portion 132c of the actuator 132 so that the actuator 132 deforms. At the same time, the contact pressing section 132b presses the switching portion 121a of the composite membrane switch 121, with the result that an electrical connection is produced in the switching area 121a. On releasing from the depression (i.e., depressed state), the key top 134 returns to the initial state as shown in FIG. 12A due to the elastic force of the actuator 132. With the above operation, the key top 134 presses the free end portion 132c, separated by a plane projection distance e from the contact pressing section 132b, of the actuator 132. Accordingly, owing to the so-called lever principle, a completed connection in the switching area 121a is possible with a weak pressing force.

In the prior art key switches 129 and 139 on the above-described keyboards 12 and 13, the key top upper surface protrudes upwardly from the base , including the drop quantity (i.e., stroke length) at the depression. However, the respective thicknesses of the housing main body 11a and the cover 11b are required to be set so that the surface of the display 19 does not come into contact with the top surfaces of the key tops even when the cover 11b takes (i.e. is in) the closed condition. Accordingly, the thickness of the notebook-size personal computer 1 main body increases, with the result that difficulty is encountered to meet the customer's requirements for the size reduction.

SUMMARY OF THE INVENTION

For the elimination of the above thickness problem, a key switch is composed of a key top, a base disposed below the key top, two links placed between the key top and the base, an elastic member situated under the key top, in a state with penetrating the base and in a state in which the elastic member serves to return the key top from a depressed position to an original, upward position, and a composite membrane switch having a switching portion actuated by the depression of the key top made through the elastic member, and the two links are rotatably connected with the key top at their one end portions and connected to the base at the other end portions to be slidable so as to be separated from each other in directions perpendicular to the depressing direction at the depression operation of the key top, wherein a slide plate is provided between the composite membrane switch and the base, the slide plate being capable of reciprocately moving in parallel to the sliding direction of the other end portions of the links, and with the slide plate moving in one of the reciprocating directions, the other end portions of the links move in directions away from each other, thereby to cause the key top to lower.

Furthermore, a key switch includes a key top, a base disposed below the key top and made to hold the key top so that the key top is movable up and down by a stroke of a given distance, an elastic plate member having a free end portion coming into contact with the key top from below and acting to return the key top, undergoing the depression, to its original upward position, and a composite membrane switch having a switching portion in which an electrical connection is controlled in accordance with the deformation of the elastic plate member caused by the depression of the key top, wherein a slide plate is provided between the composite membrane switch and the base, the slide plate being capable of reciprocately moving in a given direction, perpendicular to the depressing direction of the key top, and the elastic plate member has another end portion opposite to the free end portion and fixed to the slide plate, the elastic plate member being deformed to cause the free end portion to lower when the slide plate moves in one direction in the reciprocating movement, so that the key top drops.

In addition, the above-mentioned problem is solvable with an arrangement of a plurality of key switches each described above on a keyboard. Further, for the elimination of the problem, in a portable personal computer including the above-mentioned keyboard mounted on a housing main body and a cover openable and closable through a hinge with respect to the housing main body, a means is provided which converts the reciprocating movements of the slide plate into the opening and closure of the cover with respect to the housing main body.

Furthermore, a keyboard is constructed using key switches in which the key top of each of the key switches can be lowered by a quantity, or amount, substantially corresponding to the stroke at the depressing operation when the cover of a notebook-size personal computer moves into a closed condition, which can reduce the thickness of the notebooksize personal computer by the quantity corresponding to the stroke of the key tops.

According to this invention, the personal computer and the key switches and key board thereof are constructed such that, through the use of the rotation occurring when the hinge section linking the cover with the main body moves to the cover closing state, the key top is lowered by the quantity, or distance, corresponding to the stroke of the key top when the cover comes to its closing state and, in response to the opening of the cover, the key top rises to its normal, non-operated state. With this construction, the thickness of the personal computer is further reducible as compared with that of the prior art, which reduced thickness can meet the customer's requirements for size reduction and improved productivity.

BRIEF DESCRIPTION OF THE DRAWINGS

The object and features of the present invention will become more readily apparent from the following detailed description of the preferred embodiments taken in conjunction with the accompanying drawings in which:

FIGS. 3A and 3B are planar and side elevational views, respectively, of a slide plate in this invention;

FIGS. 8A and 8B are planar and side elevational views, respectively, illustrating a slide plate in the keyboard shown in FIGS. 7A and 7B and FIG. 8C is a cross-sectional view along line 8C—8C in FIG. 8A;

DESCRIPTION OF THE PREFERRED EMBODIMENTS

Figure 1A:
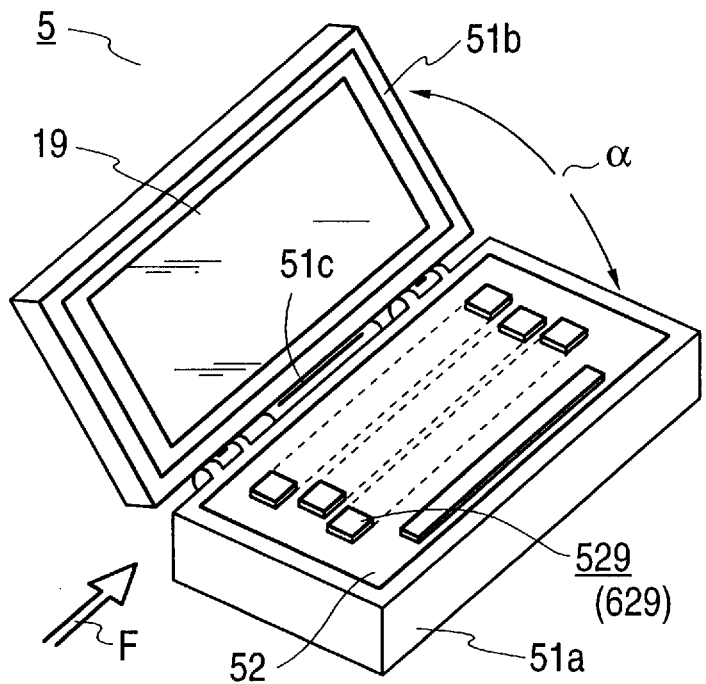
FIGS. 1A and 1B are schematic illustrations useful for describing the structure of a notebook-size personal computer according to the present invention.
Figure 1B:
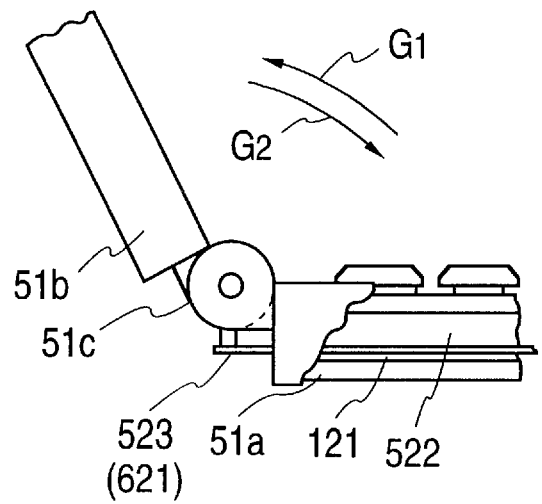
Figure 2:
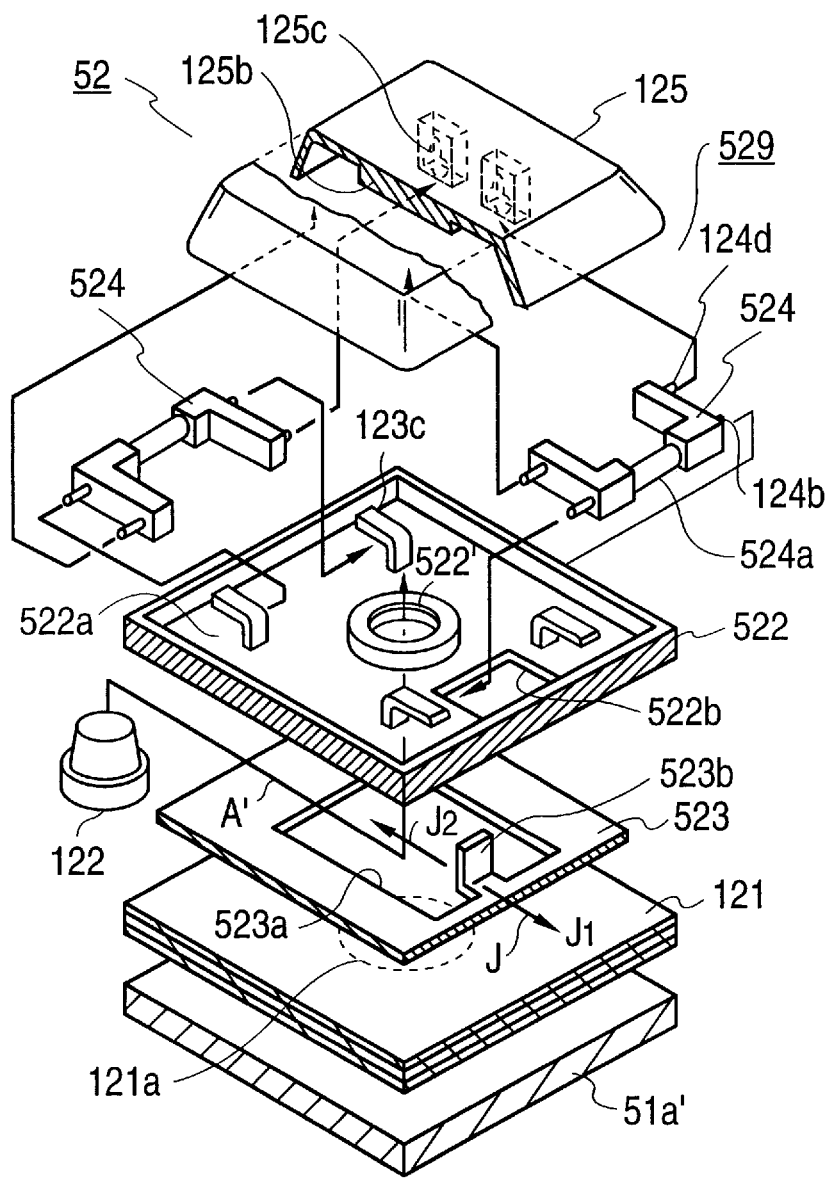
FIG. 2 is an illustration for explaining an arrangement of a keyboard according to this invention, using an area corresponding to a key switch.
Figure 4A:
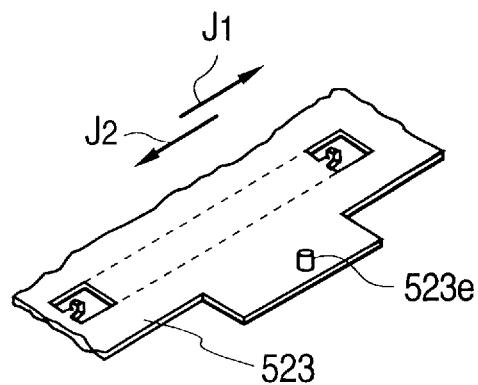
FIGS. 4A, 4B and 4C are illustrations for describing a moving actuator of the slide plate of FIG. 3.
Figure 4B:
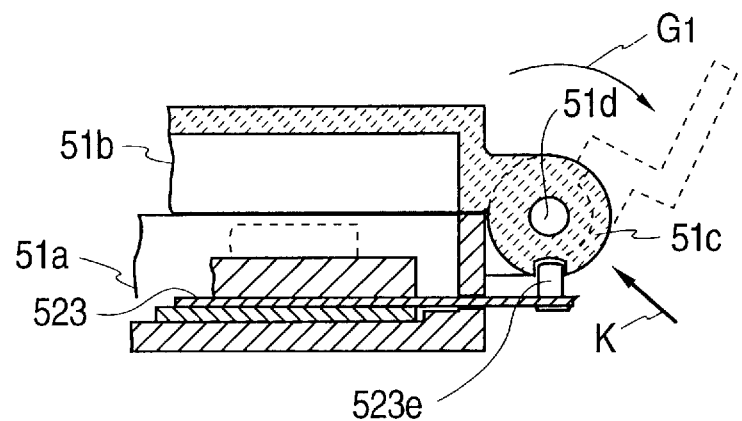
Figure 4C:
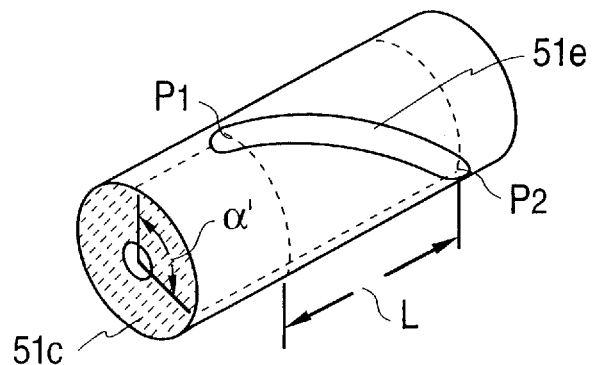

FIGS. 1A and 1B are schematic illustrations useful for describing a structural overview of a notebook-size personal computer according to the present invention, FIG. 2 is an illustration for explaining a structural arrangement of a keyboard according to this invention, taking up an area corresponding to a key switch thereof, FIG. 3 is an illustration for an explanation of a slide plate according to this invention, FIGS. 4A to 4C are illustrations for a description of a moving means of the slide plate of FIG. 3, FIG. 5 is an illustration for describing a structure and operation of a key switch applied to a keyboard, FIG. 6 is an illustration for explaining a structure and operation of a key switch based device applied to a keyboard, FIG. 7 is an illustration for a description of a structure and operation of another key switch applied to a keyboard, and FIG. 8 is an illustration for an explanation of a slide plate of the keyboard of FIG. 7. FIGS. 1A to 8 show examples of using this invention as key switches as well as the cases as shown in FIGS. 11A, 11B, 12A and 12B, and therefore the parts corresponding to those in FIGS. 11A to 12B are marked with the same reference numerals and duplicate descriptions thereof will be omitted for brevity.

FIG. 1A is a perspective view showing a notebook-size personal computer generally designated by numeral 5 and FIG. 1B is a side elevational view showing the same computer 5 viewed from a direction of arrow F in FIG. 1A.

In FIGS. 1A and 1B, the notebook-size personal computer 5 comprises a housing main body 51a for accommodating a keyboard 52 and a cover 51b for accommodating a display 19 such as a liquid crystal panel. The cover 51b is made to be openable and closable through a given angle α, for example, through an angle between 90 degrees and 180 degrees, by means of a hinge 51c fitted to a rear edge of the housing main body 51a. This structure is the same as that of the example shown in FIG. 8. Further, as well as in the case shown in FIG. 8, when selectively depressing a plurality of key switches 529 mounted in the keyboard 52 to make a given arrangement, the letters and symbols corresponding to the key switches 529 appear on the display 19 or a given processing result appears thereon.

Figure 9:
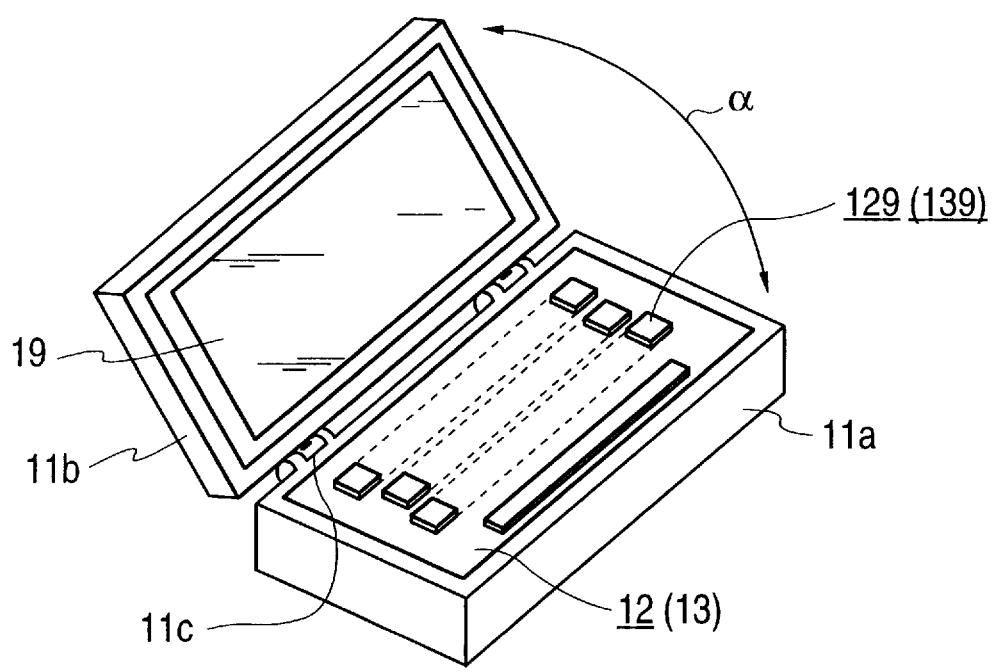
FIG. 9 is a schematic illustration for describing a notebook-size personal computer.

In the keyboard 52, there is particularly provided a slide plate 523 as shown in FIG. 1B. The slide plate 523 is interposed between a base 522 corresponding to the base 123 in FIG. 9 and a composite membrane switch 121 and passes through the housing main body 51a to extend up to the hinge 51c area. When the cover 51b is opened in an arrow $G_1$ direction, the slide plate 523 moves along the axial direction of the hinge, i.e., along a direction perpendicular to the paper surface of the figure, and, for example, toward the paper surface side (i.e., upwardly from the surface of the paper). On the other hand, when the cover 51b is closed in an arrow $G_2$ direction, the slide plate 523 shifts in the direction normal to the paper surface and, for example, toward rear surface of the paper (i.e., downwardly into the surface of the paper).

Referring to FIGS. 2 to 4C, a description will be made hereinbelow of a structure and operation of the keyboard 52 including the above-mentioned slide plate 523. For the better understanding, FIGS. 3 to 4C will be taken in the process of the description made referring to FIG. 2. In FIG. 2 showing one cut and extracted key switch, the keyboard 52 comprises a common composite membrane switch 121 described with reference to FIG. 10 and a plurality of key switches 529 disposed and fixed at given locations of the composite membrane switch 121. Each of the key switches 529 is made up of a rubber actuator 122 (the number of rubber actuators 122 corresponds to the number of contacts of the composite membrane switch 121), a slide plate 523 located on a top surface of the composite membrane switch 121, a base 522 having a through hole 522', two links 524 and a key top 125. The base 522, the links 524 and the key top 125 are substantially the same as the base 123, the links 124 and the key top 125 in FIG. 10, except that, for example, a square hole 522b is made in an area of the base 522 corresponding to each key switch 529. In the slide plate 523, for example, there is also a square hole 523a corresponding to a switching area 121a in membrane switch 121. A hook 523b extends upwardly from slide plate 523 at one side of the square hole 523a. The hook 523b has a length whereby it passes through the hole 522b of the base 522 and protrudes upwardly from the base 522.

FIGS. 3A and 3B are enlarged plan and side elevational views, respectively, of the slide plate 523. For example, a plurality of square or rectangular holes 523a are made in the slide plate 523. Each of dotted lines H indicates an area allotted for each of the switching areas 121a of the composite membrane switch 121. As illustrated, each of the square holes 523a corresponds to a respective switching area 121a of the composite membrane switch 121. As seen from FIG. 2, the rubber actuator 122 is designed to rest on and press against the membrane switch composite 121, extending through the rectangular hole 523a. Accordingly, the rectangular hole 523a has a dimension whereby, when the slide plate 523 shifts in arrow J directions, the rubber actuator 122 can pass through the rectangular hole 523a without coming into contact with the slide plate 523. The hook 523b attached to the slide plate 123 adjacent one side of each of the rectangular holes 523a can be constructed in such a manner that a portion of the slide plate 523 is bent upwardly toward the key top (not shown) at a right angle thereto.

In the vicinity of both side edges 523c parallel to the moving directions indicated by the arrows J, the slide plate 523 is supported by steps (not shown) formed in the inner wall of the housing main body 51a, and the slide plate 523 is positioned to be slightly separated from the surface of the composite membrane switch 121 existing below it. Thus, the slide plate can reciprocate in the arrow J directions without rubbing against the composite membrane switch 121. The slide plate 523 is always biased in an arrow $J_1$ direction by coil springs 526 placed between one end edge 523d, perpendicular to the J directions, and the housing main body 51a. In addition, a driving piece 523f protrudes or extends from a substantially central portion of one side edge 523c', of the aforesaid both sides 523c, and a guide pin 523e is inserted through the driving piece, or extension, 523f to protrude, for example, in the direction which is the same as the extending direction of the hooks 523b. When a stress, or force, is applied to the guide pin 523e in an arrow $J_2$ direction, the slide plate 523, moveably supported in the housing main body 51a, moves in the $J_2$ direction against the reliant biasing force of the coil spring 526. On the other hand, on releasing from the application of the stress, it moves in the opposite direction, i.e., the $J_1$ direction, due to the returning force of the coil spring 526.

Referring to FIGS. 4A to 4C, a description will be given of an example of a structure to reciprocate the slide plate 523 in the J directions. FIG. 4A is a perspective view showing a portion of the slide plate 523 of FIG. 3, FIG. 4B is a cross-sectional view showing the vicinity of the hinge 51c connecting the housing main body 51a with the cover 51b, and FIG. 4C is a perspective view showing a principal portion of the hinge 51c according to this invention, viewed from an arrow K direction in FIG. 4B. In FIGS. 4B and 4C, the cover 51b is rotatable about a shaft 51d fixed through a means (not shown) to the housing main body 51a. Further, a groove 51e is made in a side (circumferential) surface of a cylindrical, central portion of the hinge 51c fixed to the cover 51b. The groove 51e is equivalent to a helical locus (where the starting point is indicated at $p_1$ and the end point is designated at $P_2$ in FIG. 4c) formed when a point moves on the side surface of the rotating cylindrical section in the shaft 51d direction. It can also be considered that it is a portion of a screw-type groove about the shaft 51d. The groove 51e has a width and a depth which allow the tip portion of the aforesaid guide pin 523e to smoothly engage therewith. The distance L between the point $p_1$ and the point $p_2$, measured in the direction of the shaft 51d of the hinge 51c, is set to be equal to the moving distance of the slide plate 523 in the J directions. Further, when being projected to a plane perpendicular to the shaft 51d, the central angle α' of the arc, between the point $p_1$ and the point $P_2$, is set to be equal to the opening and closing angle α of the cover 51b with respect to the housing main body 51a in the housing 11 described with reference to FIG. 8.

In a state where the cover 51b is closed as shown in FIG. 4B, the guide pin 523e of the slide plate 523 is located at the point $p_2$ in the groove 51e of the hinge 51c. As the cover 51b opens in an arrow $G_1$ direction (FIG. 1B), the guide pin 523e of the slide plate 523 shifts in the groove 51e toward the point $p_1$. In consequence, the slide plate 523 moves in the $J_1$ direction in FIG. 4A. When the cover 51b is opened by the angle α, the guide pin 523e reaches the point $p_1$. At this time, the slide plate 523 stands at the normal position on the composite membrane switch 121. In the process of closing the cover 51b, the guide pin 523e moves in the groove 51e from the point $p_1$ to the point $p_2$, with the result that the slide plate 523 moves in the arrow $J_2$ direction. Thus, in accordance with the opening and closing movements of the cover 51b, the slide plate 523 reciprocates respectively in the arrow $J_1$ and the arrow $J_2$ directions.

Figure 10:
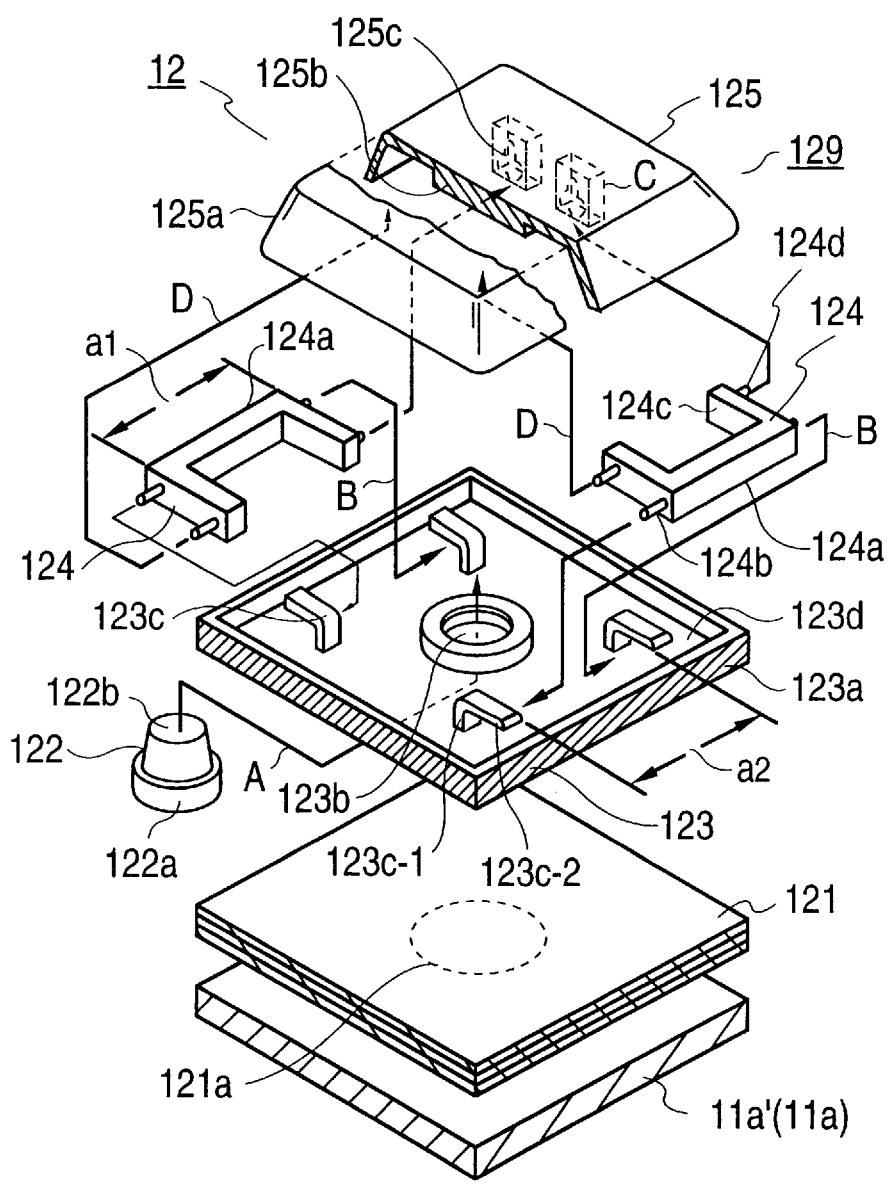
FIG. 10 is an illustration of a structure of a prior art key switch comprising a portion of a keyboard.

Referring again to FIG. 2, the square hole 522b made in the bottom plate 522a of the base 522 has a dimension whereby the hook 523b of the slide plate 523 can pass therethrough and can sufficiently reciprocate in the arrow $J_1$ and arrow $J_2$ directions. Further, the links 524 connecting the key top 125 with the base 522 differ from the links 124 of the prior key switch as shown in FIG. 10, in that each of the connecting sections 524a thereof has a central portion of a substantially circular cross section. The links 524 are mounted on the base 522, as are those of the prior key switch described with reference to FIGS. 11A and 11B. In this state, the tip portion of the hook 523b of the slide plate 523 is in contact with the connecting section 524a of one of the links 524 from the side adjacent to the switching area 121a. At this time, when the slide plate 523 is moved in the arrow $J_2$ direction in FIG. 3, since the projections 124b are disposed between the base 522 and the corresponding hooks 123c so as to be slidable relatively thereto, the connecting section 524a of the link 524 engaged by the hook 523b is moved in the arrow $J_2$ direction by means of the hook 523b.

Referring to FIGS. 1 to 4C, a description will be made hereinbelow of a method of assembling the above-mentioned key switch. In a first step and with the cover 51b opened, the composite membrane switch 121 is mounted on the bottom surface 51a' of the housing main body 51. Secondly, the slide plate 523 is placed on the composite membrane switch 121 so that each of the holes 523a of the slide plate 523 is aligned with each of the switching areas, or portions, 121a of the composite membrane switch 121. In this state, the guide pin 523e, provided on the driving piece 523f protruding (i.e., extending) from the side of the slide plate 523 to the outside of the housing main body 51a, is fitted in the groove 51e of the cover hinge 51c. Subsequently, the rubber actuator 122 is located on the switching area 121a of the composite membrane switch 121, and extends through the opening 522', and through opening 523a in the slide plate 523, as indicated by an arrow A' (FIG. 2), in the base 522 is affixed to the housing main body 51a. Thus, each rubber actuator 122, situated on a corresponding one of the switching areas of the composite membrane switch 121, is positioned and fixed by the base 522. At this time, the tip portion of the hook 523b of each slide plate 523 protrudes upwardly through the hole 522b of the base 522 as mentioned before.

Thereafter, the first set of opposite end projections 124b of each of the links 524 is interposed between the bottom plate 522a of the base 522 and the associated set of hooks 123c respectively; thus, each of the links 524 is mounted on the base 522. At this time, the shaft (connection section) 524a of the link 524 adjacent hook 523b is almost in contact with the tip portion of the hook 523b of the slide plate 523. Following this, the the second set of opposite end projections 124d of each of the links 524 are inserted into the corresponding supporting holes of the hooks 125c of the key top 125. Accordingly, the key top 125 is mounted on the base 522 by the links 524 assembled therebetween. With these processes, it is possible to complete the keyboard 52 with the necessary arranged key switches 529 as shown in FIGS. 1A and 1B.

Figure 5A:
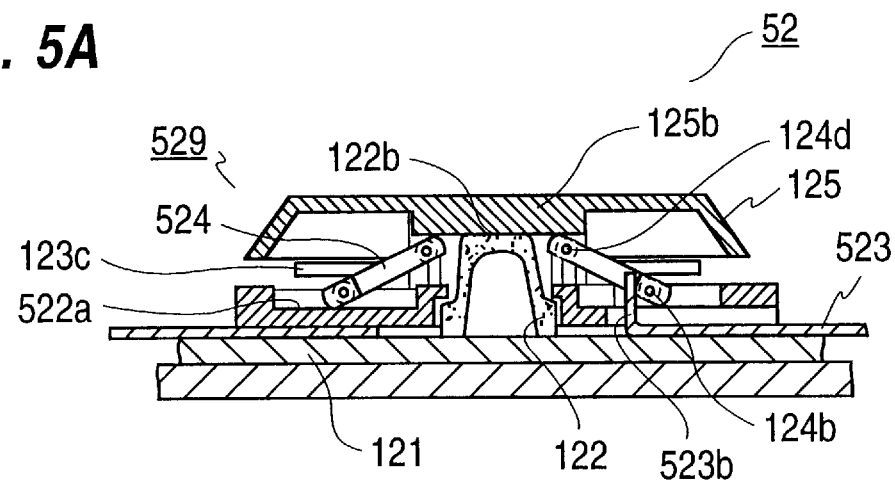
FIGS. 5A and 5B are illustrations for explaining an arrangement and operation of a key switch for a keyboard.
Figure 5B:
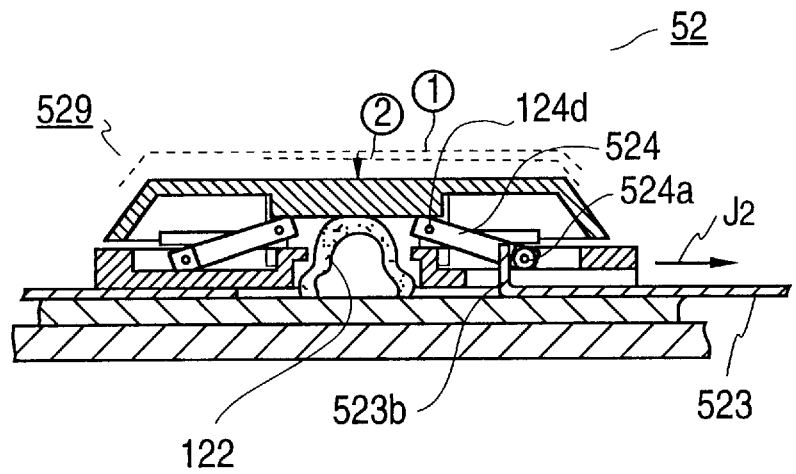
Figure 11A:
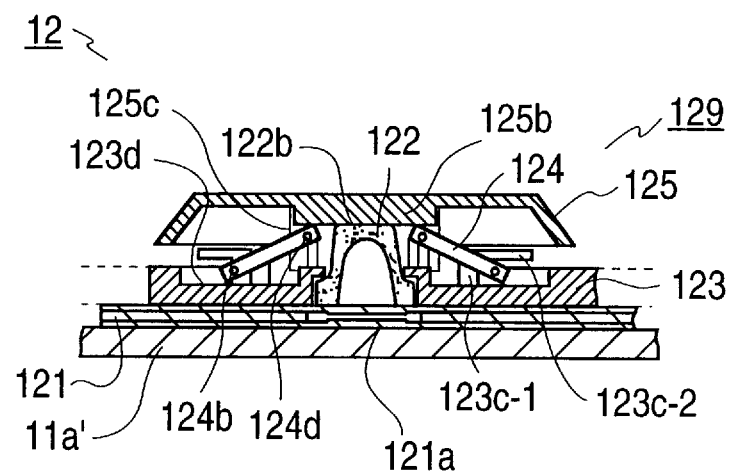
FIGS. 11A and 11B are illustrations for explaining a structure and operation of the prior art key switch shown in FIG. 10.

FIGS. 5A and 5B are cross-sectional views showing one of the key switches 529 on the above keyboard 52. FIG. 5A shows the key switch 529 which is in a non-operated or upward, initial state, while FIG. 5B illustrates the key switch 529 is in an operated or downward, depressed condition. In FIG. 5A, the key top 125 is in a state where the tip surface of its (downward) projection 125b is placed in contact with the head portion 122b of the rubber actuator 122, and the link 524 is displaced from contact with (i.e., is disengaged from) the hook 523b of the slide plate 523 —i.e., is in a free condition, receiving no movement action by the hook 523b or even contact therewith. Accordingly, as in the case of the prior art key switch as shown in FIG. 11A, in synchronism with the depression of the key top 125 or the release of it from the depression, the on and off operations take place in the switching area (not shown) formed on the composite membrane switch 121. At this time, as mentioned before, the projections 124b of each of the two links 524 are slidable between the base bottom plate 522a and the corresponding hooks 123c.

When the cover 51b (not shown) comes (i.e., is moved) into the closed state, as shown in FIG. 5B, the slide plate 523 moves in the arrow $J_2$ direction, so that the hook 523b of the slide plate 523 pulls the shaft 524a (also see FIG. 2) of the adjacent, or first, link 524 in the arrow $J_2$ direction. Consequently, the key top 125 also tries to move in the arrow $J_2$ direction. However, with respective portions of the corresponding second set of hooks 123c (i.e., a portion of each rising vertically from the bottom plate 522a of the base 522), engaging the projections 124b of the other (second) link 524 remote from the hook 523b, the latter is blocked so as not to move in the arrow $J_2$ direction. Consequently, the key top 125 comes into a partially depressed state where the one shaft 524a of the first link 524 is greatly lowered from the initial condition indicated by a dotted line, designated at 1 enclosed by a circle, to a depressed condition, indicated by a dotted line denoted at 2 enclosed by a circle. Moreover, as the shaft 524a of the first link 524 is pulled further in the arrow $J_2$ direction, the key top 125 further drops, the rubber actuator 122 then undergoing the above-mentioned reversible inversion, or compression. At this time, since the deformation of the rubber actuator 122 can be maintained with a small force, as occurs in the case that the key top 125 is vertically depressed, the whole key top 125 lowers into the uniformly lowered state, as shown by solid lines in FIG. 5B. Thus, with the closed cover 51b, the entire key top 125 is automatically kept at a uniformly low position, with the result that key top 125 is prevented from coming into contact with the display 19 (see FIGS. 1A and 1B). In other words, the closure of the cover 51b permits the thickness of the housing of the notebook-size personal computer 5 to be thinned by an amount corresponding to the extent of the drop, or downward travel, of the key tops 125.

In general, for the notebook-size personal computer, it is desirable that the manual force necessary for opening the cover is as small as possible. In the case of the notebook-size personal computer with the above-described keyboard 52, the coil spring 526 (FIG. 13) set in the slide plate 523 resiliently biases the slide plate 523 in the arrow $J_1$ direction, and hence an additional manual force for opening the cover is not needed.

Figure 6A:
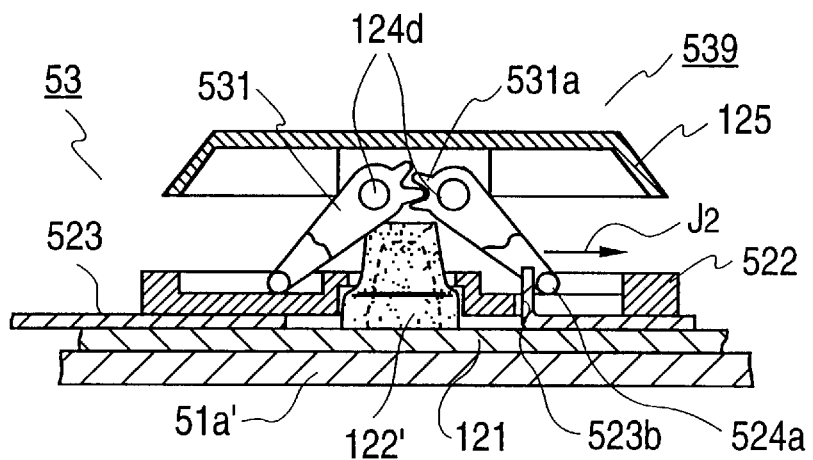
FIGS. 6A and 6B are illustrations for explaining an arrangement and operation of a device based upon a key switch of FIGS. 5A and 5B as a keyboard.
Figure 6B:
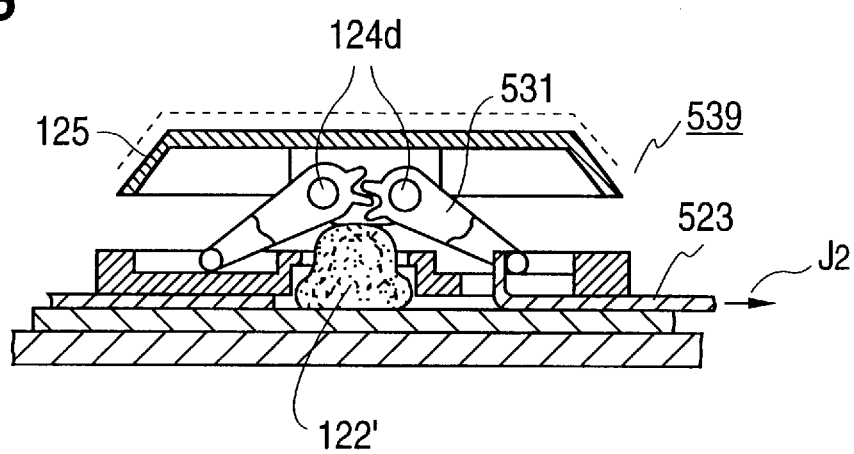

Furthermore, referring to FIGS. 6A and 6B, a description will be given hereinbelow of a structure and operation of another key switch being a modification of the key switch 529 shown in FIGS. 5A and 5B. FIG. 6A shows the initial state at no operation, while FIG. 6B illustrates a depression-operated state. Both the figures are cross-sectional views showing one of plural key switches organized, or arranged, in a keyboard. As in the example shown in FIG. 10, a keyboard 53 comprises a composite membrane switch 121 and a plurality of key switches 539 disposed and fixed at given locations on the composite membrane switch 121. The structure of the key switches 539, except for links 531, is the same as the key switch 129 described with reference to FIGS. 10, 11A and 11B. Each of the arms constituting the links 531 has a toothed gear section 531a. This arm is rotatably engaged with the key top 125 as well as the arm 124c of the link 124 in FIGS. 10, 11A and 11B. However, in this case, when being engaged with the key top 125, the gears 531a of the two links 531 come into engagement with each other.

Figure 11B:
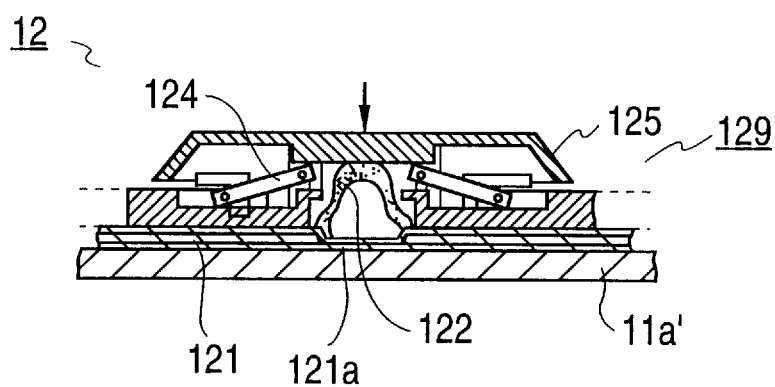

As in the example shown in FIGS. 11A and 11B, in a first assembly step, a cover 51b is kept in its open state, and a composite membrane switch 121 is mounted on a bottom surface 51a' of a housing main body 51a. Secondly, and as shown in FIGS. 5A and 5B, a slide plate 523 is placed on the respective switching areas 121a of the composite membrane switch 121. Subsequently, respective rubber actuators 122 are situated on the switching areas 121a of the composite membrane switch 121 and a base 522 is affixed, through the slide plate 523, to the housing main body 51a. At this time, as described with reference to FIGS. 5A and 5B, the hook tip portion of the slide plate 523 protrudes from a rectangular hole 522b of the base 522. Following this, the two links 531 are fitted on the base 522 so that their one side projections 124b (not shown) are interposed between a bottom plate 522a of the base 522 and a hook 123c (not shown). Thereafter, the other projections 124d of the respective links 531 are rotatably engaged with hooks 125c (not shown). Thus, for the assembling steps, the respective gears 531a of the two links 531 are engaged with each other as illustrated. In a similar way, the plurality of key tops 125 are mounted through the corresponding links on the base 522, thus constructing (i.e., assembling) the keyboard 53 with the necessary key switches 539.

In the FIG. 6A state, the hook tip portion of the slide plate 523 is in a non-contact state, i.e., it is not brought into contact with a shaft 524a of one link 531 and thus is in a free state undergoing no action. Accordingly, on depressing the key top 125 or on releasing it from the depression, the connection in the switching area 121a is established or cut off. In the above-described key switch 539, the respective gears 531a of the two links 531 are engaged with each other. Accordingly, when the key top 125 experiences the depression, these links 531 are rotated in the opposite directions about projections 124d' (corresponding to 124d in FIG. 2) connected to the key top 125. This signifies that the key top 125 does not develop an additional inclination due to the application of a partial depression but stably moves up and down while maintaining the inclination existing at the initial position, as indicated by a dotted line.

On the other hand, when the aforesaid cover 51b comes into the closed state, the slide plate 523 shifts in an arrow $J_2$ direction, and the hook 523b pulls the shaft 524a of the one link 531 in the arrow $J_2$ direction whereupon, the key top 539 drops. Also in this case, since the gears 531a of the respective links 531 are engaged with each other, the key top 125 lowers while maintaining the inclination at the initial position, as indicated by a dotted line in FIG. 6B. This embodiment can also provide a keyboard 53 in which the key tops 125 drop in response to the closure of the cover 51b to satisfy the customer's requirements for the size reduction.

In Japanese Laid-open Patent Application No. 8-54964, a flat plate member (which is referred to as a signal pad), similar to the composite membrane switch 121 in the embodiment described with reference to FIGS. 2 to 6A, is moved in parallel to the plate surface so that a plurality of rubber key-return-domes 122', similar to the rubber actuators 122 are shifted into below internal cavities of the corresponding key caps (corresponding to the key tops in the embodiment of this invention), with the result that the key cap members drops due to the gravity to come to a low position.

On the other hand, in the structure of this invention described with reference to FIGS. 2 to 6B and in accordance with the opening and closure of the cover 51b, the relative position of the rubber actuator 122 with respect to the key tops 125 does not change, and hence, it is unnecessary to make excessively large cavities in the key tops 125 for accommodating the rubber actuators 122; thus, this invention affords a small-sized key switch or keyboard.

Figure 7A:
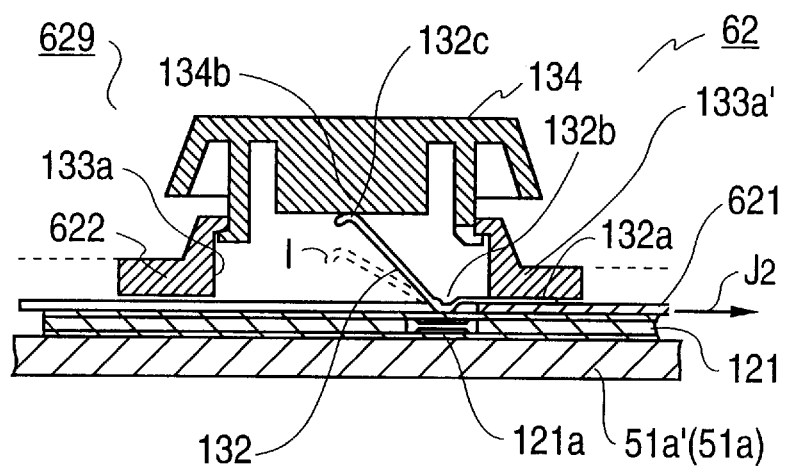
FIGS. 7A and 7B are illustrations an arrangement and operation of another key switch for a keyboard.
Figure 7B:
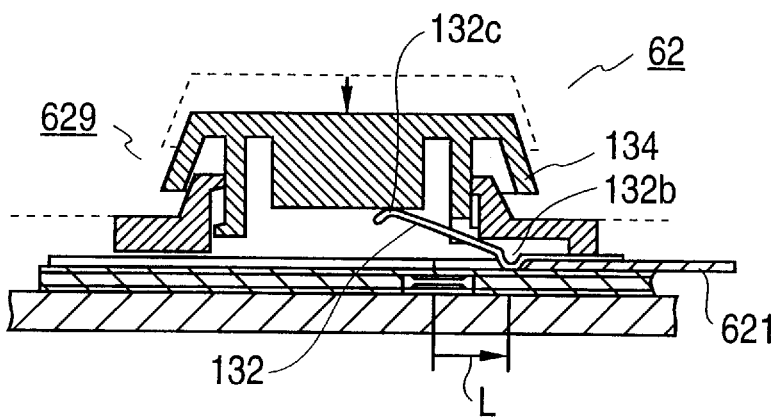

A further embodiment of this invention will be described hereinbelow with reference to FIGS. 7A, 7B and 8. A keyboard 62 shown in these figures has a structure corresponding to that of the keyboard 13 shown in FIGS. 12A and 12B. That is, FIGS. 7A and 7B are cross-sectional views showing one key switch 629, a composite membrane switch 121 common to a plurality of key switches 629 on the keyboard 62, a slide plate 621 and a base 622 which constitute the keyboard 62. The composite membrane switch 121 is the same as the conventional composite membrane switch 121 as shown in FIG. 10, and the plurality of key switches 629 are disposed on the given locations on the composite membrane switch 121. The slide plate 621 is equipped with a plurality of tongue-like actuators 132 respectively corresponding to a plurality of electric contacts formed in the composite membrane switch 121. Each of the tongue-like actuators 132 is provided with a fixed section 132a connected to the slide plate 621 and a contact pressing section 132b for pressing a respective one of the electric contacts of the composite membrane switch 121.

Figure 12A:
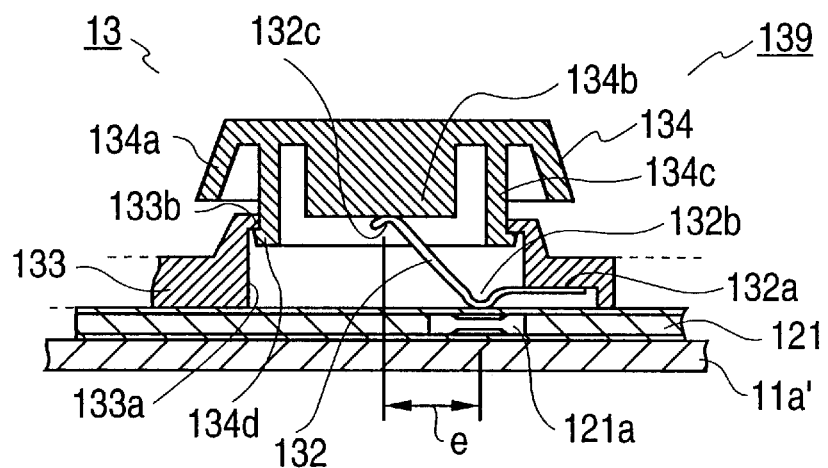
FIGS. 12A and 12B are illustrations for describing a structure and operation of another prior art key switch.
Figure 12B:
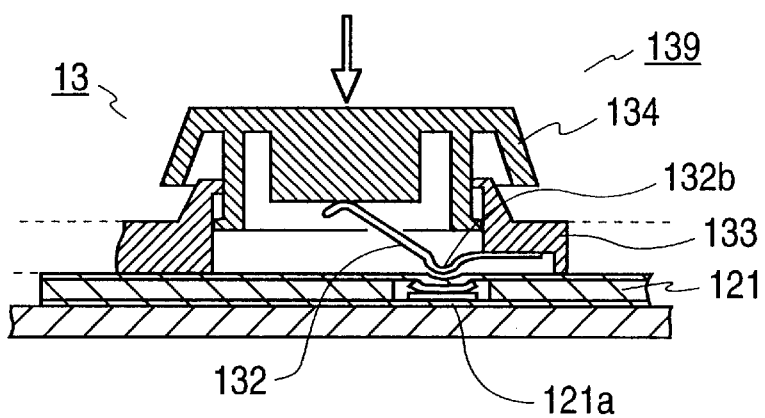

The base 622 has the same configuration as that of the base 133 described with reference to FIGS. 12A and 12B, but is thinned by a quantity (i.e., an amount) corresponding to the thickness of the slide plate 621. Each of the key tops 134 is mounted at a given, corresponding location on the base 622 so as to be movable within a given distance in the pressing direction, as well as that of the prior keyboard 13 shown in FIGS. 12A and 12B.

First, a description will be given of the slide plate 621 in the keyboard 62 of this embodiment with reference to FIG. 8A. The slide plate 621 has rectangular holes 621a similar to the rectangular holes 523a of the slide plate described with reference to FIG. 3. However, unlike the case of FIG. 3, the hook 523b is not provided therein. Instead of the hook 523b, the fixed section 132a, comprising a portion of the aforesaid tongue-like actuator 132, is connected to the portion corresponding to the hook 523b in the rectangular hole 621a, i.e., to one side of the rectangular hole 621a. The contact pressing section 132b of the tongue-like actuator 132 is positioned in the interior of the rectangular hole 621a, as shown in FIG. 8B, a partial cross-sectional view along line 8B—8B in FIG. 8A, perpendicular to the slide plate 621. Further, a free end portion 132c of the tongue-like actuator 132 is positioned at a substantially center portion of the rectangular hole 621a, as shown in the planar view of FIG. 8A.

As for the slide plate 523 in FIG. 3, the slide plate 621 has a driving piece 523f equipped with a guide pin 523e. In addition, the slide plate 621 is biased in an arrow $J_1$ direction by means of a coil spring 526 connected to a housing main body 51*a*, as in the example shown in FIG. 3.

In a first assembly step, as shown in FIG. 7A, the composite membrane switch 121 is set on the bottom surface 51*a'* of the housing main body 51*a*. Then, as in the case shown in FIGS. 4A to 4C, the slide plate 621 is placed on the bottom plate 51*a'* so that the contact pressing section 132*b* of the tongue-like actuator 132 rests on the respective one of the switching areas 121*a* of the composite membrane switch 121. In this instance, as well as the case shown in FIGS. 5A and 5B, a guide pin 523*e* (not shown) of a driving piece 523*f* (not shown) of the slide plate 621, protruding from the housing main body 51*a*, is fitted in a groove 51*e* (not shown) of a hinge 51*c* (not shown). Following this, the base 622 is fixed to the housing main body 51*a* and the key top 134 is mounted on the base 622, as in the case shown in FIGS. 12A and 12B, with the result that the keyboard 62 with the necessary key switches 629 is completed as shown in FIG. 7A. In this case, as in the case shown in FIGS. 12A and 12B, the contact pressing section 132*b* of the actuator 132 of each of the key switches 629 is positioned in the switching area 121*a* of the composite membrane switch 121 and the free end portion 132*c* comes into contact with the end surface of the downward projection 134*b* of the key top 134.

When the key top 134 experiences the depression, the free end portion 132*c* of the tongue-like actuator 132 moves downwardly, whereupon the contact pressing section 132*c* presses down on the switching area 121*a* of the composite membrane switch 121. In consequence, an electrical connection in the switching area 121*a* is produced. On releasing the key top 134 from the depression, the tongue-like actuator 132 returns to its original shape due to its own elasticity, thereby pushing the key top 134 upwardly so that the key top 134 returns to its initial position and the electrical connection is broken, or turned off.

On the other hand, when the cover 51*b* (not shown) comes into the closed condition, the slide plate 621 is shifted in an arrow $J_2$ direction by means of the mechanism similar to that described referring to FIGS. 4A to 4C. As a result, the tongue-like actuator 132, fixed to the slide plate 621, also moves in the arrow $J_2$ direction to come into contact with an edge 133*a'* such that its lower surface intersects with a through hole wall surface of the base 622. When the tongue-like actuator 132 is further, forcedly shifted in the arrow $J_2$ direction, since the base 622 is fixedly secured to the housing main body 51*a*, the tongue-like actuator 132 deforms as indicated by a dotted line I in FIG. 7A due to the stress or force, imposed thereon by the edge 133*a'*, so that the free end portion 132*c* comes down. In consequence, the key top 134, normally lifted up by the tongue-like actuator 132, drops by gravity to enter into a low position condition as indicated by a dotted line in FIG. 7B. Thus, the closure of the cover 51*b* decreases the thickness of the housing by a quantity, or amount, corresponding to the drop of the key top 134, meeting the customer's requirements for the size reduction.

Also in the above-described keyboard 62, as in the case of the keyboard 52 described with reference to FIGS. 5A and 5B, the opening of the cover 51*b* is achievable with a small force. In addition, when the cover 51*b* is in the closed state, as indicated by an arrow L in FIG. 7B, the position of the contact pressing section 132*b* of the tongue-like actuator 132 is shifted by a quantity corresponding to the movement of the slide plate 621 so that it separates from the switching area 121*a*. Accordingly, it is possible to solve the problem of tending to permanently deform the switching area 121*a* due to the pressing force thereon of the contact pressing section 132*b*, for a long time.

Japanese Laid-open Patent Application No. 5-298000 discloses a key switch structure including plate-like return springs similar to the tongue-like actuators described with reference to FIGS. 12A and 12B. In this prior art, in synchronism with the operation for closing a cover of a unit with a keyboard, a sheet having a plurality of the plate-like return springs is shifted in the direction such that the contact surface for the return spring of each of the key tops slides down on an inclined surface of the return spring, so that the key top comes down to a low position.

On the other hand, in the keyboard according to this embodiment of the invention, described above referring to FIGS. 7A to 8, the tongue-like actuator 132 deforms in accordance with the closing operation of the cover, and hence the moving quantity (i.e., amount) of the slide plate 621 required for the key top to reach the same low position is smaller than the moving quantity (i.e., amount) of the leaf spring sheet in the aforesaid published prior art. Accordingly, the area for the disposition of each of the key switches and the arrangement pitch of the key switches are reducible, thus reducing the whole size of the keyboard.

As described above, according to this invention, the keyboard is constructed so that the height of the key switches becomes lower when the cover is closed, and therefore it is possible to provide a keyboard whose height becomes lower than conventional ones, and which is suitable for portable information processing units. Although in the description of this invention the portable information processing unit is a notebook-size personal computer, it is not limited to the notebook-size personal computer and, instead, this invention is applicable to any information processing unit as long as a housing main body and a cover are linked so as to be moveable relatively to each othe, e.g. through a hinge. Further, although in the description of this invention the movements of the slide plate due to the opening and closure of the cover depends upon the engagement of the groove, made in the hinge of the cover, with the guide pin installed on the slide plate, this invention is not limited to the combination of the groove and the guide pin; instead, it is also appropriate to use a different moving means, for example, the engagement between a gear formed on the hinge and a gear made on the slide plate, which can offer the same effects.

The composite membrane switch employed in the above embodiments may be replaced by one which is composed of a single insulating film having at least one pair of electrical contacts formed on a common surface of the film, and a connecting element which connects the pair of electrical contacts of each key switch in response to the depression of the key top.

It should be understood that the foregoing relates only to preferred embodiments of the present invention and that it is intended to cover all changes and modifications of the embodiments of the invention herein, used for the purposes of the disclosure, which do not constitute departures from the spirit and scope of the invention.

What is claimed is:

1. A key switch comprising:
    a key top;
    a base disposed below said key top and comprising a planar portion having first and second openings therein;
    a pair of links disposed between said key top and said base, respective first end portions of said links engaging said key top and second, opposite end portions of said links engaging said base, depression of said key top in a depressing direction, substantially perpendicular to the base and moving from an initial position to a depressed position, producing sliding movement of one of the first and second end portions of each of said links relatively to the respective key top and base engaged thereby, in a first sliding direction substantially perpendicular to the depressing direction;

the membrane switch comprising a composite structure of an insulating sheet having an electrical switching element therein operated to on and off states in response to a force applied to and released therefrom, respectively, said membrane switch being fixedly positioned with respect to said base;

an elastic member extending from said key top and through said first opening to and engaging the electrical switching element of the membrane switch, the elastic member responding to depression of the key top to actuate the switch to an on state and, after release of the depression, resiliently returning said key top from the depressed condition thereof to the initial condition thereof;

a slide plate provided between said membrane switch and said base mold and moveable in reciprocating, first and second opposite directions parallel to said sliding directions, said slide plate having an opening therein and a hook thereon, said elastic member extending through the opening and contacting said membrane switch throughout the reciprocating directions of movement of said slide plate, and said hook extending through said second opening in said base so as to contact said second end portion of one of said links; and when said slide plate is moved in one of the reciprocating, first and second sliding directions, the respective second end portions of said pair of links slide respectively move in opposite ones of said first and second sliding directions thereby to separate from each other and permit said key top to be lowered to the depressed position.

2. A key switch according to claim 1, wherein said elastic member is a bowl-like rubber actuator which undergoes a reversible deformation in response to the depression of said key top.

3. A key switch according to claim 2, wherein said elastic member deforms in response to a forced lowering of said key top.

4. A keyboard comprising a plurality of key switches arranged in an array, each of said key switches having a structure according to claim 1.

5. A portable information processing unit in which said keyboard according to claim 4 is disposed in a main body of a housing having a cover and a hinge connecting the cover to said housing main body and affording rotation of the cover between opened and closed positions relatively thereto, said unit further comprising an actuator which moves said slide plate in the reciprocating, first and second directions of movement in response to opening and closing movements, respectively, of said cover with respect to said housing main body.

6. A portable information processing unit according to claim 5, wherein said actuator comprises a guide pin affixed to said slide plate and received in a groove formed in said hinge so that said guide pin is movable along the groove in accordance with the opening and closing operations of said cover.

7. A key switch according to claim 1, wherein said elastic member deforms in response to a forced lowering of said key top.

8. A key switch according to claim 1, wherein said first end portions of said pair of links comprise respective gears engaged with each other and rotatable relatively to each other and with respect to the key top.

9. A key switch comprising:

a key top;

a base disposed below said key top, said key top being mounted on said base so as to be movable in reciprocating, up and down directions over a given distance, said base comprising a base plate portion having an opening therein;

an elastic member having a first end portion contacting a bottom of said key top and the elastic member extending downwardly from the first end portion thereof and through said opening in said base to a bottom end portion thereof which is fixed relatively to the base, said elastic member maintaining said key top in an initial position and being deformed by depression of the key top from the initial position thereof to a depressed, actuated position of the key top and said elastic member returning said key top to said initial position of said key top after said depression of said key top ends;

a membrane switch including an insulating sheet having an electrical switching element therein in which an electrical connection is controlled by a force applied thereto upon deformation of said elastic member in response to the depression of said key top, said membrane switch composite being disposed beneath said base and fixedly positioned with respect to said base; and a slide plate disposed between said membrane switch and said base and moveable in reciprocating sliding directions perpendicular to the depressing direction of said key top, said slide plate having an opening therein and said elastic member contacting said membrane switch through said opening independently of the reciprocating movement of said slide plate, said elastic member having a second end portion fixed to said slide plate, said first end portion thereof being deformed in the depressing direction when said slide plate is shifted from the first and to the second of the reciprocating sliding directions so that said key top moves in the depression direction.

10. A key switch according to claim 9, wherein said elastic member comprises a tongue-like actuator having a contact pressing section located between said first end portion and said second end portion thereof and, when said first end portion is lowered by said key top due to depression of said key top, said contact pressing section completes an electrical connection in said switching area and, when said slide plate is moved in one of the reciprocating first and second sliding directions, a portion of said actuator between said free end portion and said contact pressing section comes into contact with and is deflected by said base and causes said first end portion to move in the depressing direction.

11. A keyboard comprising a plurality of key switches arranged in an array, each of said key switches having a structure according to claim 9.

12. A portable information processing unit in which said keyboard according to claim 11 is disposed in a main body of a housing having a cover and a hinge connecting the cover to said housing main body and affording rotation of the cover between opened and closed positions relatively thereto, said unit further comprising an actuator which moves said slide plate in the reciprocating, first and second directions of movement in response to opening and closing movements of said cover, with respect to said housing main body.

13. A portable information processing unit according to claim 12, wherein said actuator comprises a guide pin affixed to said slide plate and received in a groove formed in said hinge so that said guide pin is movable along the groove in accordance with the opening and closing operations of said cover.

14. A key switch, comprising:
a pressure responsive element having a switching area portion responsive to application of a force thereto and to release of the force therefrom to switch between on and off conditions, respectively;
a slide plate disposed for sliding, reciprocating movement relatively to the pressure responsive element in a sliding direction between first and second positions, the slide plate having an opening therein through which the switching area portion of the pressure responsive element is exposed and having a hook element extending upwardly therefrom;
a base plate having a first opening therein through which the switching area portion of the pressure responsive element is exposed and a second opening therein through- which the hook extends vertically and upwardly, the second opening having a dimension in the first direction to accommodate movement of the hook between the first and second positions of the slide plate;
a key top; and
an actuation mechanism interconnecting the key top to the base plate and, in the first position of the slide plate, resiliently supporting the key top in a raised position corresponding to a non-operated state of the key top, enabling selective movement of the key top from the raised position in a second direction, perpendicular to the first direction, to a depressed position corresponding to an operated state of the key top in response to a depression force applied thereto and, upon release of the depression force, returning the key top to the raised position and non-operated state thereof and, in absence of the depression force and in response to movement of the slide plate to the second position thereof, the actuation mechanism being depressed such that it ceases resiliently supporting the key top and the key top is moveable to a lowered position and a non-operated state thereof.

15. A key switch as recited in claim 14, wherein the actuation mechanism further comprises:
a resilient element extending through the opening in the slide plate and through the first opening of the base plate and between the key top and the switching area portion of the pressure responsive element, the resilient element exerting a resilient force, resiliently opposing depression of the key top from the raised position thereof and transferring a depression force, applied to the key top, to the switching area portion thereby to switch the switching area portion to an on condition; and
a linkage mechanism extending between the key top and the base and mounting the key top to the base while permitting movement of the key top between the raised and depressed positions thereof and, in response to movement of the slide plate from the first and to the second positions thereof, moving the key top from the raised position and to the depressed position thereof against the resilient force of the resilient element.

16. A key switch as recited in claim 15, wherein the linkage mechanism comprises a pair of links pivotally connected at first ends thereof to a bottom surface of the key top and disposed for sliding and pivotal movement relatively to a surface of the base plate.

17. A key switch as recited in claim 16, wherein upper end portions of the links comprise respective gears maintained in mutual engagement.

18. A key switch, comprising:
a key top;
a base;
a slide plate disposed for sliding, reciprocating movement in a sliding direction between first and second positions;
an actuation mechanism having a resilient element operative, in the first position of the slide plate, for resiliently supporting the key top in a non-operated, raised position relatively to the base and resiliently yielding to a depression force applied to the key top to produce a downward key stroke motion of the key top, substantially perpendicular to the sliding direction of the slide plate, permitting the key top to be depressed toward the base thereby to complete an electrical connection and produce a key signal output specific to the depressed key and, upon release of the key top, the resilient element resiliently returning the key top in an upward, return key stroke motion opposite to the downward key stroke motion, to the raised position and non-operated state thereof; and
the slide plate, when moved from the first to the second position thereof, deforming the resilient element and thereby disabling the actuation mechanism and the resilient element thereof from resiliently raising the key top and thereby permitting the key top to drop by gravity in the downward key stroke motion direction and toward the base plate, to a storage position and a non-operated state thereof.

19. A key switch as recited in claim 18, further comprising:
a pressure responsive element having a switching area portion responsive to application of a force thereto and to release of the force therefrom to switch between on and off conditions, respectively; and
the actuation mechanism further comprises:
an opening in the slide plate and a first opening in the base plate through which the resilient element extends, between the key top and the switching area portion of the pressure responsive element, the resilient element exerting a resilient force opposing depression of the key top from the raised position thereof and transferring a depression force applied to the key top to the switching area portion to switch same to an on condition, and
a linkage mechanism extending between the key top and the base and mounting the key top to the base while permitting movement of the key top between the raised and depressed positions thereof and, in response to movement of the slide plate from the first position to the second position thereof, moving the key top from the raised position to the depressed position thereof against the resilient opposing force of the resilient element.

20. A key switch as recited in claim 19, wherein the linkage mechanism comprises a pair of links pivotally connected at first ends thereof to a bottom surface of the key top and disposed for sliding and pivotal movement relatively to a surface of the base.

21. A key switch as recited in claim 20, wherein upper end portions of the links comprise respective gears maintained in mutual engagement.

22. A keyboard, comprising:

a base;

plural keys tops;

plural actuation mechanisms mounting the plural keys tops, respectively, to the base, each of the actuation mechanisms having a resilient element exerting a resilient force supporting the respective key top at a non-operated, raised position relatively to the base and, in response to a key actuation depressing force, resiliently yielding to permit the key top to be depressed toward the base, in a downward key stroke motion, to an operated, depressed position thereby to complete an electrical connection and produce a corresponding key depression signal output and, upon release of the depressing force, resiliently returning the key top to the non-operated, raised position, in an upward, return key stroke motion;

a cover mounted for rotational movement, relatively to the keyboard, between opened and closed positions;

a slide plate responsive to movement of the cover to the closed position thereof, transversely to the key stroke motion, depressing the respective resilient elements of the plural actuation mechanisms and thereby disabling the actuation mechanisms from resiliently raising the respective key tops, permitting the key tops to drop by gravity in the downward key stroke motion direction and toward the base plate, to a storage, non-operated position.

23. A keyboard as recited in claim 22, further comprising:

a pressure responsive element having a switching area portion responsive to application of a force thereto and to release of the force therefrom to switch between on and off conditions, respectively; and each actuation mechanism further comprises:

an opening in the slide plate and a first opening in the base plate through which the resilient element extends, between the key top and the switching area portion of the pressure responsive element, the resilient element exerting a resilient force opposing depression of the key top from the raised position thereof and transferring a depression force applied to the key top to the switching area portion to switch same to an on condition, and a linkage mechanism interconnecting the key top and the base to limit movement of the key top to a fixed, raised position relatively to the base.

* * * * *

UNITED STATES PATENT AND TRADEMARK OFFICE
CERTIFICATE OF CORRECTION

PATENT NO.: 5,874,696
DATED : February 23, 1999
INVENTOR(S): Kazutoshi HAYASHI et al.

It is certified that error appears in the above-identified patent and that said Letters Patent is hereby corrected as shown below:

Col. 1, line 29, change "a" to --$a$--.

Col. 17, line 23, delete "-".

Signed and Sealed this

Fourteenth Day of September, 1999

Attest:

Q. TODD DICKINSON

*Attesting Officer*      *Acting Commissioner of Patents and Trademarks*